United States Patent
Meyer et al.

(10) Patent No.: US 10,853,800 B1
(45) Date of Patent: Dec. 1, 2020

(54) DOCUMENT GENERATION WITH DYNAMIC WATERMARKING

(71) Applicant: United Services Automobile Association (USAA), San Antonio, TX (US)

(72) Inventors: Gregory B. Meyer, San Antonio, TX (US); Jeffrey D. Rogers, Helotes, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 403 days.

(21) Appl. No.: 15/496,479

(22) Filed: Apr. 25, 2017

(51) Int. Cl.
 *G06Q 20/38* (2012.01)
 *G06F 21/16* (2013.01)

(52) U.S. Cl.
 CPC ....... *G06Q 20/38215* (2013.01); *G06F 21/16* (2013.01); *G06Q 20/382* (2013.01); *G06Q 20/3821* (2013.01); *G06Q 20/3825* (2013.01); *G06F 2221/2111* (2013.01)

(58) Field of Classification Search
 CPC .... G06Q 20/042; G06Q 20/10; G06Q 20/382; G06Q 20/20; G06Q 40/02; G06Q 40/128; G06F 21/16; G06T 1/005
 See application file for complete search history.

(56) References Cited

U.S. PATENT DOCUMENTS

| | | | | |
|---|---|---|---|---|
| 5,982,896 A * | 11/1999 | Cordery | ........... | G07B 17/00435 283/17 |
| 6,285,990 B1 * | 9/2001 | Lee | ................. | G07B 17/00362 705/60 |
| 6,408,330 B1 * | 6/2002 | DeLaHuerga | ........ | A61J 1/1437 709/217 |
| 7,222,235 B1 * | 5/2007 | Mitsui | ..................... | G06T 1/005 713/176 |
| 7,236,610 B1 * | 6/2007 | Luo | ......................... | G06F 21/16 348/E5.006 |
| 9,626,724 B2 * | 4/2017 | Tatham | ................ | G06Q 20/042 |
| 10,198,783 B2 * | 2/2019 | Martin | ................. | G06T 1/0085 |
| 2002/0152169 A1 * | 10/2002 | Dutta | ................... | G06Q 20/042 705/45 |
| 2003/0056104 A1 * | 3/2003 | Carr | ....................... | G07D 7/005 713/176 |
| 2005/0091338 A1 * | 4/2005 | de la Huerga | ...... | H04L 63/0853 709/217 |

(Continued)

*Primary Examiner* — Mamon Obeid
*Assistant Examiner* — Jahed Ali
(74) *Attorney, Agent, or Firm* — Fish & Richardson P.C.

(57) ABSTRACT

Techniques are described for generating and presenting a digital document for a transfer. A check service may generate the digital document based on provided check data. The digital document may be stored on a user device and presented to a recipient, for example through the display of the user device. The digital document may also be provided to the recipient in an email or other type of communication. The check service may generate a digital watermark to include on the digital document. The watermark may be unique to the particular document, and may be algorithmically generated based on data that is associated with the particular document, such as a serial identifier, a transaction identifier, an amount, a user identifier of the sender, etc. The digital watermark may be regenerated when the recipient presents the document for payment, to confirm document validity.

9 Claims, 6 Drawing Sheets

(56) References Cited

U.S. PATENT DOCUMENTS

| | | | |
|---|---|---|---|
| 2005/0135654 A1* | 6/2005 | Li | G06T 1/005 382/100 |
| 2007/0069023 A1* | 3/2007 | Jones | G06K 9/6203 235/454 |
| 2013/0318356 A1* | 11/2013 | Diehl | G06F 21/10 713/176 |
| 2014/0219495 A1* | 8/2014 | Hua | H04L 63/08 382/100 |
| 2014/0297517 A1* | 10/2014 | Gnanasekaran | G06Q 20/227 705/39 |
| 2014/0372266 A1* | 12/2014 | Tatham | G06Q 20/042 705/33 |
| 2015/0063659 A1* | 3/2015 | Poder | G06T 1/0021 382/118 |
| 2015/0067344 A1* | 3/2015 | Poder | G06F 21/316 713/176 |
| 2017/0053373 A1* | 2/2017 | Martin | H04N 1/32299 |
| 2018/0109570 A1* | 4/2018 | Kowal | H04L 63/10 |
| 2019/0272366 A1* | 9/2019 | Mayes | G06F 21/35 |

* cited by examiner

DOCUMENT GENERATION WITH DYNAMIC WATERMARKING

BACKGROUND

Traditionally, individuals have used certified checks, cashier's checks, or bank checks as an instrument to transfer a certified amount of funds to a payee. Obtaining such a check requires the individual to visit a bank branch, prove their identity to a teller, and receive the paper copy of the check. The individual may then present the check as a source of certified funds to a payee. Because the check is certified by the issuing financial institution, use of such a check provides the payee with confidence that the check is actually backed by guaranteed, reserved funds, i.e., that the check will not bounce. As more individuals switch to using virtual and/or online-only banks which may have limited, or no, physical branch locations, obtaining a certified check, cashier's check, or bank check has become more difficult.

SUMMARY

Implementations of the present disclosure are generally directed to generating a digital document for presentation on a user device. More specifically, implementations are directed to generating a digital check including a digital watermark that is uniquely associated with the digital check and/or generated specifically for the digital check based on data corresponding to the particular check, such as a serial identifier (ID), transaction ID, payor ID, amount, and/or other information.

In general, innovative aspects of the subject matter described in this specification can be embodied in methods that includes actions of: receiving, from a user device, data to be included on a digital check, the data provided through a user interface (UI) executing on the user device; determining a digital watermark to be included on the digital check, the digital watermark being unique to the digital check; generating the digital check that includes the digital watermark and the data; and transmitting the digital check for presentation through the UI on the user device.

Implementations can optionally include one or more of the following features: the actions further include determining a serial identifier (ID) that uniquely corresponds to the digital check; the digital check is generated to include the serial ID; the digital watermark is generated for the digital check based at least partly on the serial ID; the digital watermark includes a plurality of curves that are generated using an algorithm that receives the serial ID as an input; the actions further include receiving a presentation of the digital check for payment; the actions further include retrieving the serial ID and the digital watermark from the digital check; the actions further include regenerating the digital watermark based on the serial ID; the actions further include validating the digital check based on a correspondence between the retrieved digital watermark and the regenerated digital watermark; the actions further include determining a transaction ID associated with the digital check; the actions further include associating the transaction ID with the serial ID in a data structure; the digital watermark is generated for the digital check based at least partly on the transaction ID; the digital watermark includes a plurality of curves that are generated using an algorithm that receives the transaction ID as an input; the actions further include receiving a presentation of the digital check for payment; the actions further include retrieving the serial ID and the digital watermark from the digital check; the actions further include determining the transaction ID that is associated, in the data structure, with the retrieved serial ID; the actions further include regenerating the digital watermark based on the transaction ID; the actions further include validating the digital check based on a correspondence between the retrieved digital watermark and the regenerated digital watermark; the data describes an amount of funds to be transferred using the digital check and an account number of an account to be used as a source of the funds; the actions further include verifying that a current balance of the account is at least the amount; and/or the actions further include receiving, from the user device, a digital signature that is applied to the digital check through the UI on the user device and, in response, reserving an amount of funds to be accessible only through presentation of the digital check.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following technical advantages and/or technical improvements over previously available solutions. By providing a digital check including a watermark that is unique to the particular check, the watermark generated based on an algorithm that is not exposed to the public, implementations provide a mechanism for ensuring, when the check is presented, that the check is valid and not fraudulent, and that the check has been authorized for payment by the owner of the account. This fraud prevention mechanism provides for reliable automatic validation of the check prior to payment, thus reducing the instance of fraud through counterfeit checks. Accordingly, implementations avoid the expenditure of processing power, network capacity, memory, storage space, and/or other computing resources that are expended by traditional systems to recover from fraud activities. Moreover, implementations further prevent fraud by avoiding the use of a physical cashier's check that may be stolen or copied, and by providing a digital check in an on-demand, or just-in-time manner, such that the digital check exists for a short period of time. In particular, the digital check can be generated at time of delivery (e.g., when it is needed) and the digital check can be delivered to the recipient immediately thereafter, either by message-attached image sent to the recipient or digital capture of an image of the check by the recipient's camera. In either instance, the recipient may deposit the digital check (e.g., immediately) after receiving it, such that the digital check is no longer vulnerable to theft or fraud.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
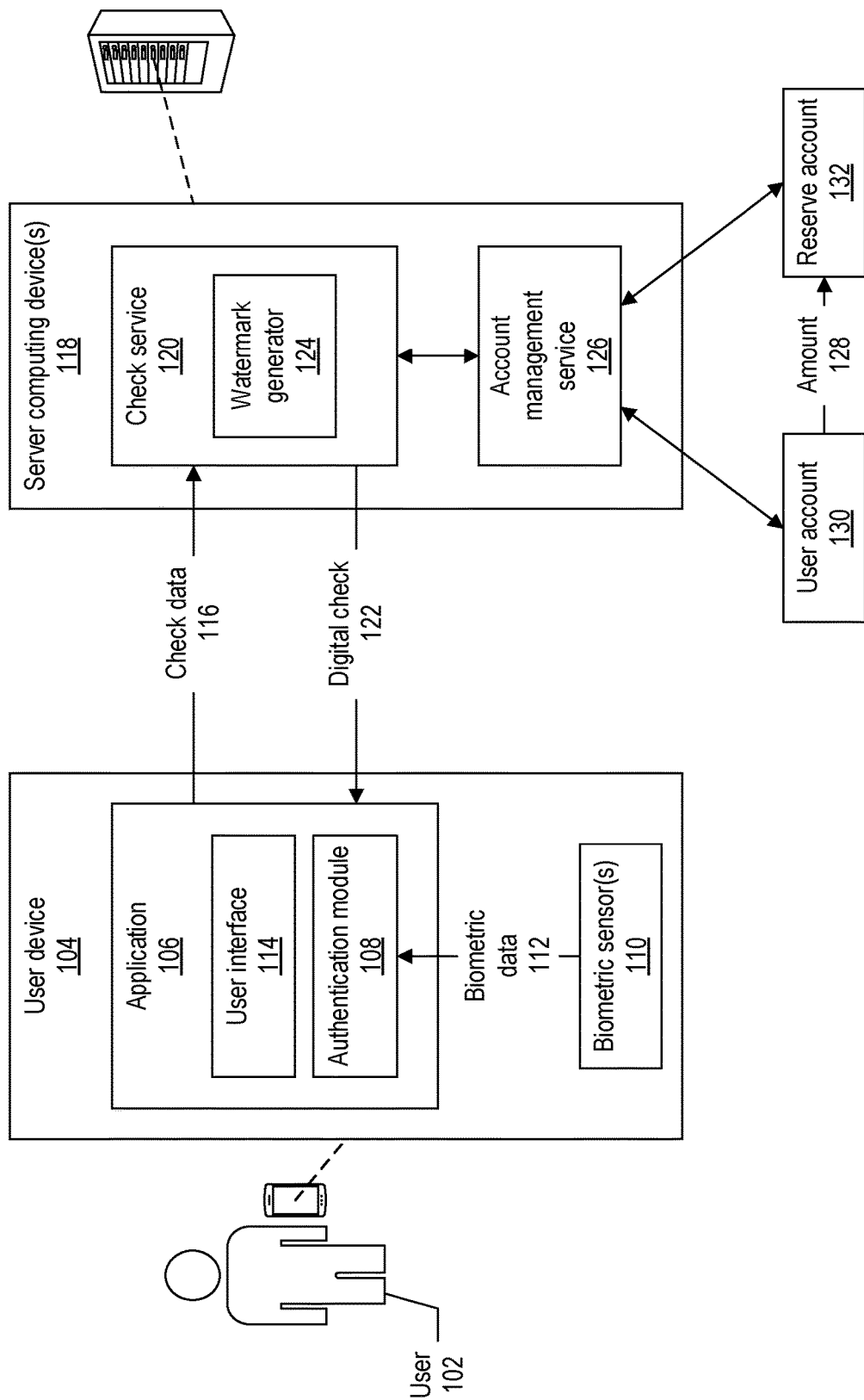
FIG. 1 depicts an example system for digital check generation and presentation, according to implementations of the present disclosure.

Implementations of the present disclosure are directed to systems, devices, methods, and computer-readable media for generating and presenting a digital document, a digital check that can be used to transfer funds between individuals and/or entities. A user may interact with the user interface (UI) of an application executing on a user device (e.g., smartphone) to provide check data to be used to generate a digital check (which may also be described as an electronic check). For example, the user may enter the amount of funds for the check, an account number of an account to be used as a source of the funds, a designated payee as recipient of the funds, a memorandum (memo) describing a purpose for the funds transfer, and/or other check data. The check data may be sent to a check service, which validates the request. The check service may generate the digital check based on the provided check data, and send the digital check back to the user device. The digital check may be stored on the user device and presented to the payee (recipient of the funds). In some instances, the digital check may be presented to the payee through the display of the user device. For example, the user (payor) may use the application executing on the user device to present the digital check that was previously stored in memory on the user device. The payee may then take a picture of the displayed digital check, using a camera for example, and use the image to redeem the digital check and receive the funds. Alternatively, the user (payor) may use the application to print the digital check onto paper, and the user may present the printed digital check to the payee.

In some implementations, the check service may generate a digital watermark to include on the digital check. The digital watermark may be unique to the particular check, and may be generated based on information that is associated with the particular check, such as a serial identifier (ID) (e.g., serial number) of the check, a transaction ID associated with the check, an amount of the check, a user ID of the user (payor), and/or other information. The digital watermark may be regenerated when the payee presents the check for payment and/or redemption, to confirm that the check is valid and has not been fraudulently spoofed.

Traditionally, individuals have used certified checks, cashier's checks, or bank checks as an instrument to convey certified funds to a payee. In instances where an individual is not close to a physical bank branch, or if the individual uses a bank that does not have physical branches, obtaining a certified check (or other source of bank-certified funds) may be difficult. Given the still-prevalent use of certified checks in instances where a certified source of funds is called for, such as closing a home purchase, contracting for renovations, putting down a deposit for a purchase or rental, and so forth, the difficulty of obtaining a certified check may block some individuals from obtaining necessary goods or services. Implementations provide a technique through which an individual can obtain a digital check that provides a certified, guaranteed source of funds to be transferred to a payee who asks for certified funds in various circumstances, thus obviating the need for an individual to travel to a physical bank branch to obtain a paper version of a certified check.

Through the implementations described herein, a user can generate their own digital check. The application used to request the digital check may provide a suitable level of authentication to verify the user's identity. For example, biometric data (e.g., fingerprint, voice print, retinal scan, and so forth) may be used to verify the user's identity as a person who is authorized to request a certified digital check that draws funds from the user's bank account. In some instances, the application may request an enhanced level of authentication for the user compared to other usage scenarios. For example, the user may access basic account information after being authenticated based on a username and password, or other credentials, and additional credentials and/or biometric data may be collected and verified as an additional level of authentication, in instances where the user is using the application to request a digital check.

Implementations described herein provide a mobile checking payment system that does not require the user to opt into a third party check processing service, and instead enables the user to interact online with their bank (or other financial institution) to request and receive the digital check, which the user themselves may present to the payee. Trust issues are an important concern for users in their banking activities, and implementations enable the user to interact with their trusted financial institution to request and receive the check, instead of requiring the user to interact with a third party check processing service that the user may not know or trust as much as their financial institution. Implementations enable users to make mobile paperless payments to any payee with a bank account. The user may interact with an application including a UI that collects the check data for generating the check. Given that the user logs into the application with a set of credentials and/or biometric authentication, the user's identity is verified electronically in lieu of a traditional scenario in which the user presents identification to a bank teller to request a certified check. The system may check that funds are available in the account that the user has indicated, and the digital check may be generated and provided to the user for digital signature. The user may then show the image of the check to the payee, who can take a picture of the signed check and deposit as they would normally.

Implementations enable the entire process, end-to-end, to be completed in a minimal amount of time. For example, the user may be negotiating with a payee for the purchase of a car, home rental, or some other transaction in which certified funds are requested by the payee. The user may (e.g., in the presence of the payee), use the application to request and receive a digital check. The user may sign the digital check and present it to the payee for image capture. Given that the digital check is backed by certified and guaranteed funds, the payee may have confidence that the check is valid and will not bounce. In this way, implementations provide a real-time, or nearly real-time, mechanism for providing a certified transfer of funds between parties, requiring only the amount of time needed for data communication, processing, verification and fraud checking, and without requiring the payor to visit a physical bank branch to obtain a certified check in the traditional manner.

FIG. 1 depicts an example system for digital check generation and presentation, according to implementations of the present disclosure. As shown in the example of FIG. 1, a user 102 may use a user device 104 that executes an application 106. The user device 104 may include any suitable type of computing device. In some instances, the user device 104 is a portable (e.g., mobile) computing device, such as a smartphone, tablet computer, wearable computer, automotive (e.g., in-vehicle) computer, and so forth. The user device 104 may also be a less portable type of computing device, such as a desktop computer, laptop computer, and so forth.

The application 106 may include a UI 114, such as a graphical user interface that includes any suitable number of screens or windows. The UI 114 may include any suitable number, type, and arrangement of UI elements that are used to present information to the user 102 and/or to receive information that is input by the user 102. In some implementations, the application 106 may include an authentication module 108 that is used to authenticate the user 102 (e.g., verify the user's identity). Such authentication may secure the application 106 and prevent access by unauthorized individuals.

In some implementations, the user device 104 may include one or more biometric sensors 110 that generate biometric data 112 that is used to authenticate the user 102. For example, the biometric data 112 may include a fingerprint image of the user 102, collected by a biometric sensor 110 that is a fingerprint scanner. The biometric data 112 may include an audio recording of the user's voice, captured by a biometric sensor 110 that is a microphone or other audio input device. The biometric data 112 may include a retinal scan of the user, and/or image(s) of the user's face or other body parts, collected by a biometric sensor 110 that is a camera or other image capture device. The biometric data 112 may also indicate other current physiological characteristics of the user 102, including but not limited to one or more of the following: heart rate, pulse, blood pressure, perspiration level, blood sugar level, body temperature, respiration rate, pupil dilation, galvanic skin response (e.g., electrodermal activity), and/or brain wave activity (e.g., neuro-electrical activity). In some implementations, the biometric data may include data describing voluntary and/or involuntary movements of the user 102(1) such as jitters, tremors, eye movements, nervous movements (e.g., tapping figures), and so forth. The collected biometric data 112 may be compared to previously collected and stored biometric data for the user 102, to verify the user's identity. Such a comparison may be performed on the user device 104 or on the server computing device(s) 118.

Other authentication techniques may also be used in addition to, or instead of, authentication based on biometric data. For example, the user 102 may provide credentials such as one or more of a username, login, password, personal identification number (PIN), answers to knowledge-based questions (e.g., "what is your mother's maiden name"), and/or other suitable credentials. Such credentials may be compared to previously specified credentials for the user, to verify the user's identity. In some implementations, a federated identity system may be employed to authenticate the user 102. For example, a version of an Open Authorization (OAuth) standard may be employed to authenticate the user 102, based on the presence of an authorization token that was previously downloaded to, and stored on, the user device 104.

As described above, in some implementations a higher level of authentication may be required if the user 102 is requesting generation of a digital check. For example, the user 102 may be initially authenticated to access the application 106 based on provided credentials (e.g., username, password, and/or PIN) and/or OAuth. If the user 102 attempts to access the portion of the application 106 for requesting a digital check, biometric data 112 may be collected and used to re-confirm the user's identity. Such a step-up in authentication may reduce the risk that the application 106 may be used fraudulently to request a digital check, such as in situations where the user device 104 may have been stolen.

The user 102 may enter check data 116 through the UI 114. The check data 116 may include one or more of the following: an amount of funds for the check, a designated payee (recipient) for the funds; an account number or other identification of an account to use as the source of the funds; and/or a memo describing the purpose for, or otherwise describing, the funds transfer. The check data 116 may be communicated (e.g., transmitted), over one or more networks, to a check service 120 executing on one or more server computing devices 118. The server computing device(s) 118 may include any suitable number and/or type of computing devices, such as distributed computing server(s) (e.g., cloud computing device(s)).

The check service 120 may communicate with an account management service 126 to verify the check data 116. Such verification may include verifying that the specified user account 130 is a valid account, verifying that the account is owned by the user 102, and/or verifying that the account currently includes sufficient funds to cover the requested digital check (e.g., that the current account balance is at least the amount specified in the check data 116). The account management service 126 may execute on the server computing device(s) 118 or elsewhere. Alternatively, the check service 120 itself may perform the verification.

If the check data 116 is verified, the check service 120 may generate the digital check 122 to include the check data 116, or at least a portion thereof. In some implementations, the check service 120 may determine a serial ID to be used to identify the digital check 122. The serial ID may also be described as a serial number, although the serial ID is not limited to including only numeric information. The serial ID may uniquely identify the digital check 122 amongst the digital checks 122 that are generated by the check service 120, and/or among a general population of digital checks generated by various services. The serial ID may be included on the digital check 122 along with the check data 116. In some implementations, the check service 120 may also generate a transaction ID that identifies the transaction in which the digital check 122 is used to transfer funds. In some instances, the transaction ID may not be included on the digital check 122, and may be associated with the serial ID in a data structure managed by the check service 120. For example, the server computing device(s) 118 may store a lookup table, database, or other data structure that provides a mapping between serial ID and transaction ID for one or more digital checks 122 that have been generated by the check service 120.

The digital check 122 may be communicated (e.g., transmitted), over one or more networks, to the user device 104 for presentation in the UI 114 of the application 106. In some implementations, the UI 114 may include a control that enables the user 102 to provide a digital signature on the digital check 122. The digital signature may be text, image(s), graphics, and/or other data that signifies the user's signature on the digital check, and that indicates the digital check 122 is presentable by a payee to redeem the check in the amount of funds shown on the digital check 122. The application 106 may send a signature indication message to the check service 120 to indicate that the user 102 has signed the check. In some implementations, in response to receiving the signature indication message, the account management service 126 may move the amount 128 of funds from the user account 130 (e.g., the user-owned bank account) to a reserve account 132, where the amount 128 is the amount of funds specified in the check data 116 and indicated on the digital check 122. Such reserving of the amount 128 of funds specified on the check may ensure that the funds are available when the payee presents the check for payment. The reserving of funds constitutes a guarantee that the digital check 122 may not be denied for payment when presented by the payee.

The signed digital check 122 may be securely stored in memory on the user device 104 or in some other secure data storage. The user 102 may then use the application 106 to provide and/or present the signed digital check 122 to the payee who is to receive the amount 128 of funds. Implementations provide various ways in which the digital check 122 may be presented or otherwise provided to the payee. In some instances, the application 106 may display the signed check in the UI 114, and the user 102 may show their user device 104 to the payee as the check is being displayed. The payee may then use their own mobile device, a camera, or some other device with image capture capability to take a picture of the UI 114 presenting the check. The payee may then present the image of the check to a bank or some other entity that can cash the check, deposit the check in the payee's account, or otherwise redeem the check for the amount of funds shown on the check. In some instances, the user 102 may use the application 106 to print a hard copy of the signed check onto paper, and the user 102 may present the printed check to the payee. In some instances, the user 102 may provide the digital check 122 itself to the payee, such as in an attachment to an email, text message, or other suitable communication.

The digital check 122 may be in any suitable file format. In some implementations, the digital check 122 is formatted according to a version of the Portable Document Format (PDF) promulgated by Adobe Systems™. Other formats may also be used, such as any suitable version of JPEG, GIF, BMP, and/or other digital file formats. In some implementations, the communications between the user device 104 and the server computing device(s) 118 may be encrypted to ensure the security of the information being transmitted. The digital check 122 may be stored, on the user device 104 and/or elsewhere, in a location that is secured against unauthorized access. The digital check 122 may also be stored in an encrypted form, and may be decrypted prior to being displayed in the UI 114 (e.g., for presentation to the payee).

The check may take the place of one or more types of traditional checks, including but not limited to certified checks, cashier's checks, bank checks, teller checks, personal checks, and/or convenience checks (e.g., checks that draw funds from a credit card account or other line of credit). In some implementations, the user 102 may be provided with an incentive to use the digital check 122 as a means to transfer funds to the payee. For example, in instances where the digital check 122 operates as a convenience check, such that the amount 128 of funds is drawn a user account 130 that is a line of credit, the user 102 may be given a lower than normal interest rate for drawing funds from the line of credit using the digital check 122. Using a digital check 122 instead of a physical printed check may lower the overhead cost of conducting funds transfers, by saving the parties a trip to a physical bank branch, and avoiding printing costs in some instances.

In some implementations, the check service 120 may include a watermark generator 124. Alternatively, the watermark generator 124 may execute separately from the check service 120 (e.g., as an API that is called by the check service to request a watermark). The watermark generator 124 generates a digital watermark that is applied to the digital check 122. In some implementations, the digital watermark is generated specifically for the particular digital check 122 being created, such that the watermark is unique to the particular check among a population of checks. The watermark may be generated based on one or more data items, at least some of which may be uniquely associated with the check. For example, the watermark may be generated based on one or more of the serial ID, the transaction ID, a user ID of the user 102 (e.g., user account number, name, login, etc.), an amount of the check, a memo for the check, the payee, the bank issuing the check, the date of the check (e.g., when the check is generated), and/or other any suitable data item, or any combination of these. The digital watermark is described further with reference to FIG. 3.

Figure 2:
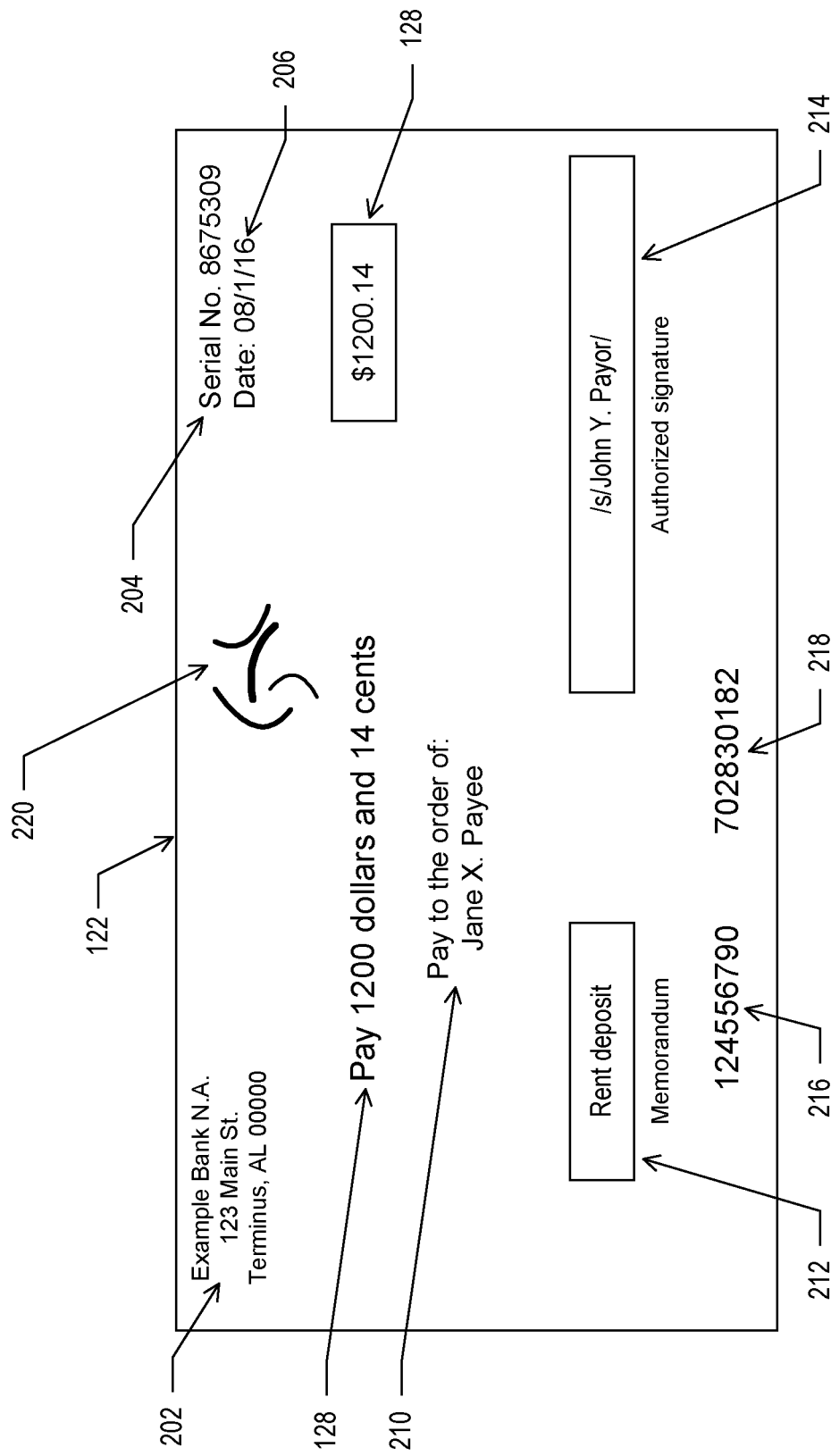
FIG. 2 depicts an example of a digital check that includes a check-specific digital watermark, according to implementations of the present disclosure.

FIG. 2 depicts an example of a digital check 122 that includes a check-specific digital watermark 220, according to implementations of the present disclosure. As shown in the example of FIG. 2, the check 122 may include an identification 202 of the bank that has issued the check (e.g., the bank where the user 102 owns an account that is the source of the funds). The identification 202 may include a name and/or address of the bank. The check 122 may include a serial ID 204, as described above, which uniquely identified the particular check 122. The check 122 may also include a date 206 and/or time when the check 122 was generated. The check 122 may include the amount specified by the user 102 in the check data 116. The amount may be specified numerically and/or through text. The check 122 may include the payee 210, as identified by the user 102 in the check data 116. The payee 210 may be identified based on their name, mailing address, email address, user name (e.g., for some online service), telephone number, and/or through other identifying information. In some instances, the check 122 includes a memo 212 that is provided by the user 102. The memo 212 may describe the transfer as being for a particular purpose, or otherwise. The check 122 may include a signature block 214 where the user 102 may apply their digital signature through the UI 114. The check 122 may also include a routing/transit number 216 and/or an account number 218 that identifies the user account that is a source of the funds.

Although the example of FIG. 2 depicts a check 122 with a particular arrangement of particular data items, implementations are not limited to this example. Implementations support any appropriate format and/or arrangement for the digital check 122, with any suitable set of data items presented on the digital check 122. For example, FIG. 2 depicts the watermark 220 has being in a particular location on the check 122, separated from the other data shown on the check 122. In some implementations, the watermark 220 may be presented at least partly as a background with respect to other data items, such that other data items at least partly overlay the watermark 220.

Figure 3:
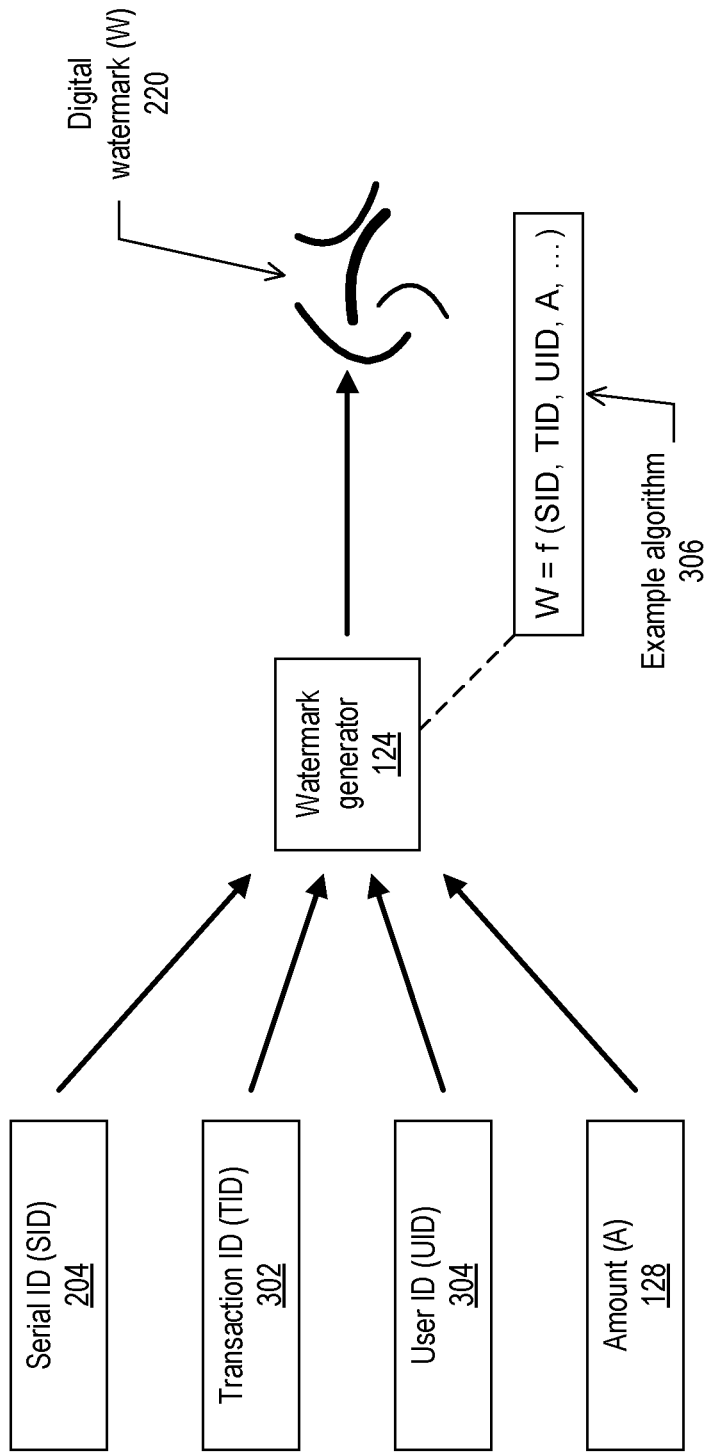
FIG. 3 depicts a schematic of example data that may be used to generate a digital watermark for a digital check, according to implementations of the present disclosure.

FIG. 3 depicts a schematic of example data that may be used to generate a digital watermark for a digital check, according to implementations of the present disclosure. As shown in the example of FIG. 3, the watermark generator 124 may receive, as input, various types of input data including one or more of the Serial ID 204, the transaction ID 304, the user ID 304, the amount 128, and so forth. Other data may also be used as input to generate the watermark 220. In some implementations, the watermark generator 124 generates the watermark 220 using an algorithm 306 that generates one or more curves to include in the watermark 220. The algorithm 306 may receive, as input, the various input data items such as serial ID, transaction ID, user ID, amount, user account number, a name or identifier of the payee, the memo, and so forth. In some implementations, the algorithm 306 may include one or more of such data items as coefficients. The output of the algorithm 306 may mathematically describe the form of the watermark 220. In examples where the watermark is a unique set of curves, the algorithm 306 may output the set of curves with a set of characteristics for each curve, such as one or more of a length, radius, concavity, inflection point(s), thickness, color, position (e.g., in X, Y coordinates), and/or other characteristics of each curve.

The watermark 220 may provide a stenographic tool for determining the validity of the check (e.g., for verifying that the check is not fraudulent). For example, when the payee presents the check for payment, the check service 120 may regenerate the watermark based on the information originally used to generate the watermark. As a particular example, the watermark may be generated based on the serial ID, the payee, and the amount of the check. When the check is presented for payment, the serial ID, payee, and amount may be retrieved from the presented check and used to regenerate the watermark. If there is a correspondence between the watermark that is retrieved from the presented check and the watermark that is regenerated based on the other retrieved data, the check may be determined as valid and payment in the amount shown on the check may be made to the presenting payee. Such validation confirms that the presented check is the same digital check that was originally generated for the user 102, preventing fraud spoofing or counterfeiting of the digital check.

Although examples herein depict the watermark as a set of curves of various sizes, shapes, inflections, curvatures, and relative locations, implementations support the use of other suitable designs or arrangements for the watermark 220. In general, the watermark 220 may be unique to the digital check 122 on which it is included, with respect to the shape, size, color, arrangement, thickness, pattern, and/or number of the elements that are included in the watermark 220. In some instances, the watermark 220 may be generated at least partly based on information that is not included on the digital check 122, to further prevent malicious parties from successfully spoofing the watermark 220. For example, the transaction ID may be employed as one of the inputs to the algorithm 306 used for generating the watermark 220, where the transaction ID is associated with the serial ID in a back-end data structure (e.g., lookup table), but the transaction ID is not included on the digital check 122.

Figure 4:
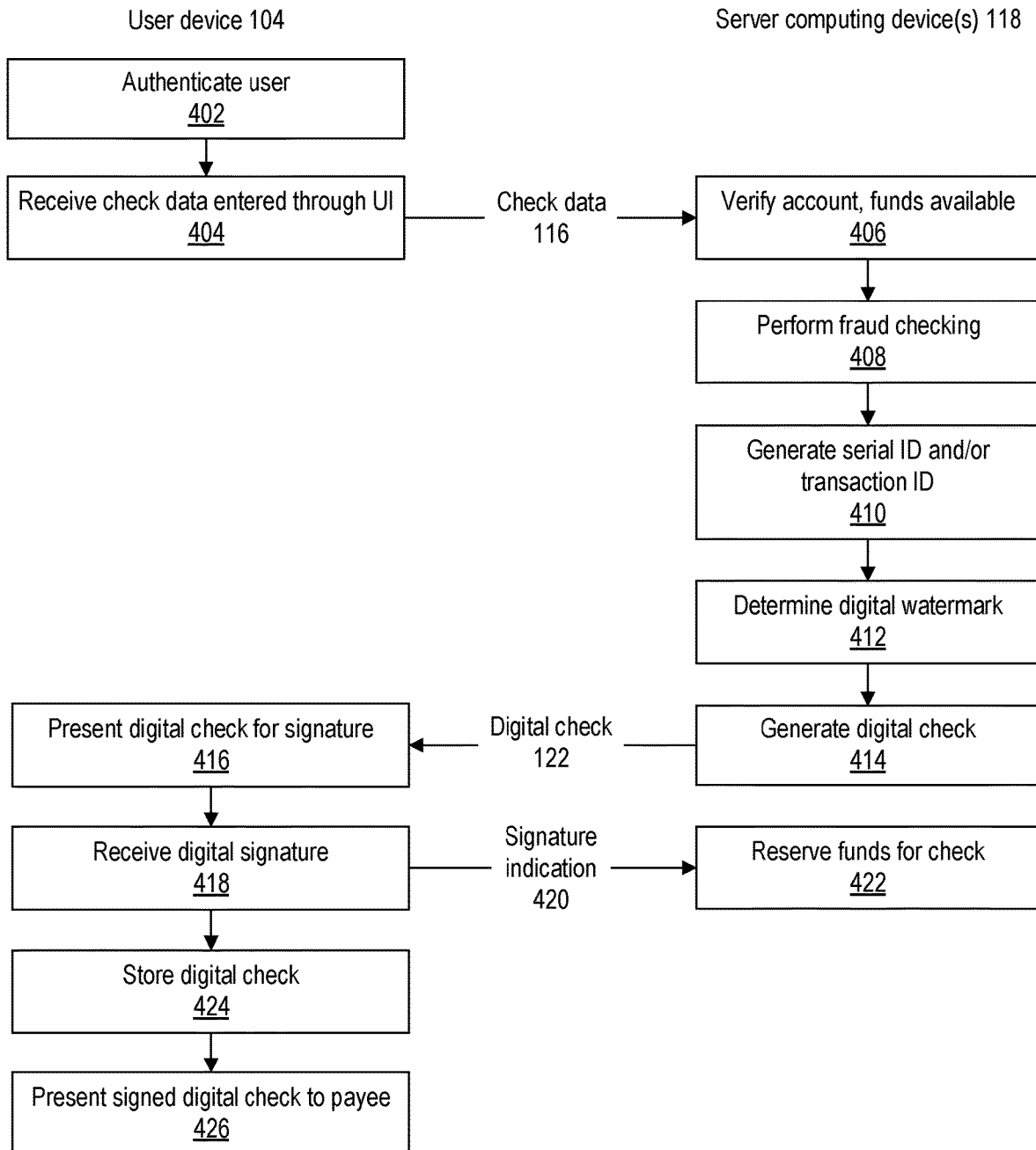
FIG. 4 depicts a flow diagram of an example process for digital check generation and presentation, according to implementations of the present disclosure.

FIG. 4 depicts a flow diagram of an example process for digital check generation and presentation, according to implementations of the present disclosure. Operations of the process may be performed by the application 106, the UI 114, the authentication module 108, the check service 120, the watermark generator 124, the account management service 126, and/or other software module(s) executing on the user device 104, the server computing device(s) 118, or elsewhere.

The user 102 is authenticated (402). As described above, such authentication may be enhanced (e.g., with biometric authentication and/or additional credentials) if the user 102 is attempting to request a digital check 122 through the application 106.

The check data 116 may be received (404), as entered by the user 102 through the UI 114 of the application 106. The check data 116 may include one or more of the following: an amount for the check, a payee name or other identification, a memorandum, a user account number (or other account identification) for the account to be used as a source of the funds, and so forth. The check data 116 may be transmitted, over one or more networks, from the user device 104 to the server computing device(s) 118. In some instances, the check data 116 may also include an identifier of the user 102 who is currently logged into the application 106 and requesting the check, such as a user name, login name, account number, personal name, or other identifying information for the user. The check data 116 may be sent as part of a request, from the user 102, for generation of a digital check 116 based on the specified check data 116.

One or more operations may be performed to verify (406) the check data 116. For example, verification may include verifying that the specified account is a valid, active account that is owned by the user 102. Verification may also include determining that the specified account currently holds sufficient funds that are at least the amount specified for the check. In some implementations, the user 102 may specify one or more rules governing how and/or when digital checks may be generated for that user, the rule(s) specified through the application 106. The verification may include verifying that the rule(s) are satisfied for a particular instance when the user 102 has requested a digital check 122. For example, the user 102 may specify a rule that checks may only be generated in an amount that is less than or equal to a user-specified maximum amount (e.g., $500). As another example, the user 102 may specify a rule that checks may only be generated for certain payees that are pre-authorized by the user 102 to receive digital checks from the user. As another example, the user 102 may specify a rule that checks may only be generated if the user 102 is currently in a particular geographic location or region (e.g., when the user 102 is not traveling outside their home country, city, state, etc.) as determined based on the current location of the user device 104. Location of the device may be determined using a satellite-based navigation system such as the Global Positioning System (GPS), or through other suitable techniques. Rules may also limit the maximum number and/or total amount of the digital checks that may be generated for the user in a given time period (e.g., per day, per month, etc.). In some instances, the user 102 may also specify a rule that disables the generation of digital checks for that user and/or for particular account(s) owned by the user.

If the verification operations indicate that the account is invalid, or lacking sufficient funds, a message may be sent to the user device 104 and presented in the UI 114, indicating that the check request has been denied and indicating a reason for the denial. The user 102 may be prompted to specify a different account, specify a different amount, or otherwise modify the input check data 116 to be used for generating the check.

In some implementations, fraud checking is performed (408) prior to generating and sending the digital check 122. Fraud checking may include checking that the user device 104 that transmitted the check data 116 has been pre-registered by the user 102 as a valid device for use in requesting digital checks from the check service 120. Fraud checking may also include checking that the current location of the user device 104 (e.g., determined through GPS or other techniques) is a typical location for the user device 104 and/or user 102. Fraud checking may generally determine whether the current behavior, location, or other context for the user device 104 and/or user 102 is not atypical. If the behavior, location, and/or other context is outside the norm for this particular user 102, such behavior may be determined to be suspicious and the request for the digital check 122 may be blocked until the user 102 can further establish that they are who they claim to be, and that they are not acting under impairment or duress. In some instances, if the circumstances of the check request are determined to be suspicious in some way, an additional verification code may be sent to the user device 104 (e.g., in a text message). The user 102 may be prompted to enter the verification code through the UI 114 of the application 106, to verify that their request is not fraudulent. Verification may also include a customer service representative calling the user 102 and confirming, through a telephone conversation, that the user is who they claim to be and that they are not under duress or impaired in some way.

If the verification and fraud check operations indicate that check generation is to proceed, a serial ID may be generated (410) for the check. The serial ID may include numeric data and/or other types of data, and may be generated to uniquely identify the check among a population of checks. In some implementations, a transaction ID may also be generated and associated with the serial ID in a data structure (e.g., lookup table) as described above.

The digital watermark may also be determined (412) as described above. For example, the watermark may be generated using the algorithm 306. The digital watermark may be unique to the particular check, and may be generated based on one or more of the serial ID, transaction ID, user ID, payee ID, amount, memo, date and/or time when the check is generated, and/or other information.

The digital check 122 may be generated (414) to include the serial ID, bank identification, user identification, amount, payee, memo, and/or other information as described above. The digital check 122 may also include the digital watermark. The digital check may be communicated, over one or more networks, to the user device 104 and presented in the UI 114 of the application 106 (416).

The application 106 may prompt the user 102 to add their digital signature to the check through the UI 114. On receiving the user's digital signature on the check (418), the application 106 may transmit a signature indication 420 to the check service 120, indicating that the check has been signed. In response to receiving the signature indication 420, the amount of funds may be reserved (422) by moving the funds into a reserve account as described above.

The signed digital check may be stored (424) on the user device 104 and later accessed by the application 106 for presentation to the payee (426). As described above, such presentation may include displaying the check to allow the payee to capture an image of the check, communicating the digital check in an email, text message, or other communication, and/or otherwise providing the check to the payee.

Figure 5:
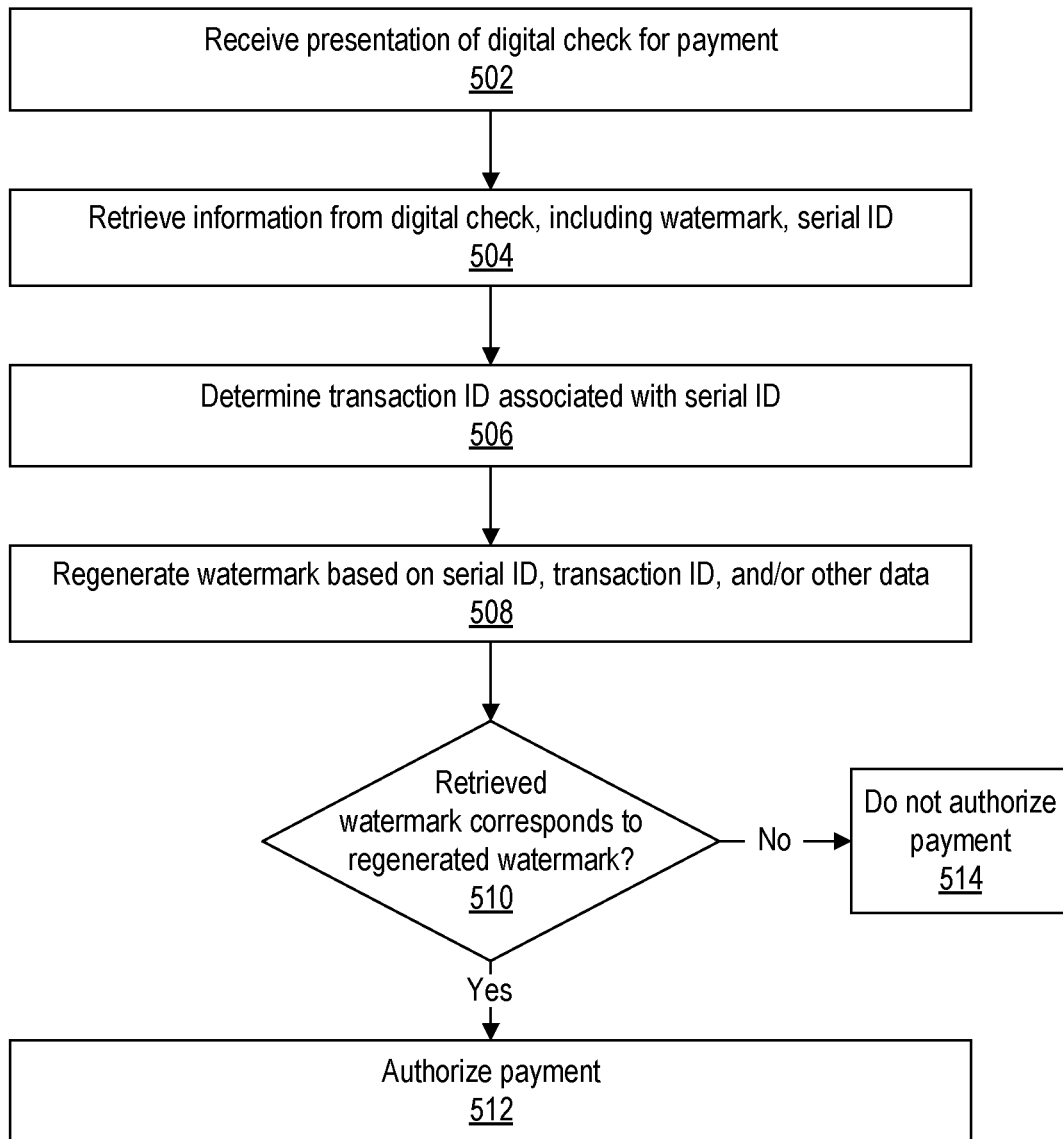
FIG. 5 depicts a flow diagram of an example process for validating a digital check, according to implementations of the present disclosure.

FIG. 5 depicts a flow diagram of an example process for validating a digital check, according to implementations of the present disclosure. Operations of the process may be performed by the application 106, the UI 114, the authentication module 108, the check service 120, the watermark generator 124, the account management service 126, and/or other software module(s) executing on the user device 104, the server computing device(s) 118, or elsewhere.

A presentation of the digital check 122 may be received (502). For example, the payee may present the check for payment through the bank or other financial institution that issued the check, in the amount shown on the digital check 122.

Information may be retrieved (504) from the digital check 122, such as the serial ID, amount, user ID, payee, and so forth. The digital watermark may also be retrieved from the check. In some implementations, the transaction ID may be determined (506) based on the serial ID, by accessing the data structure (e.g., lookup table) that lists associations between serial ID and transaction ID for multiple generated checks.

The digital watermark may be regenerated (e.g., using the algorithm 306) based on the input data that was originally used to generate the watermark, such as one or more of the serial ID, transaction ID, user ID, amount, payee ID, memo, and so forth. A comparison is made between the retrieved watermark and the regenerated watermark (510). If the two watermarks correspond to one another (e.g., exactly), the check may be determined as valid and payment may be authorized (512) on the check. If the two watermarks are different, payment may not be authorized (514).

Figure 6:
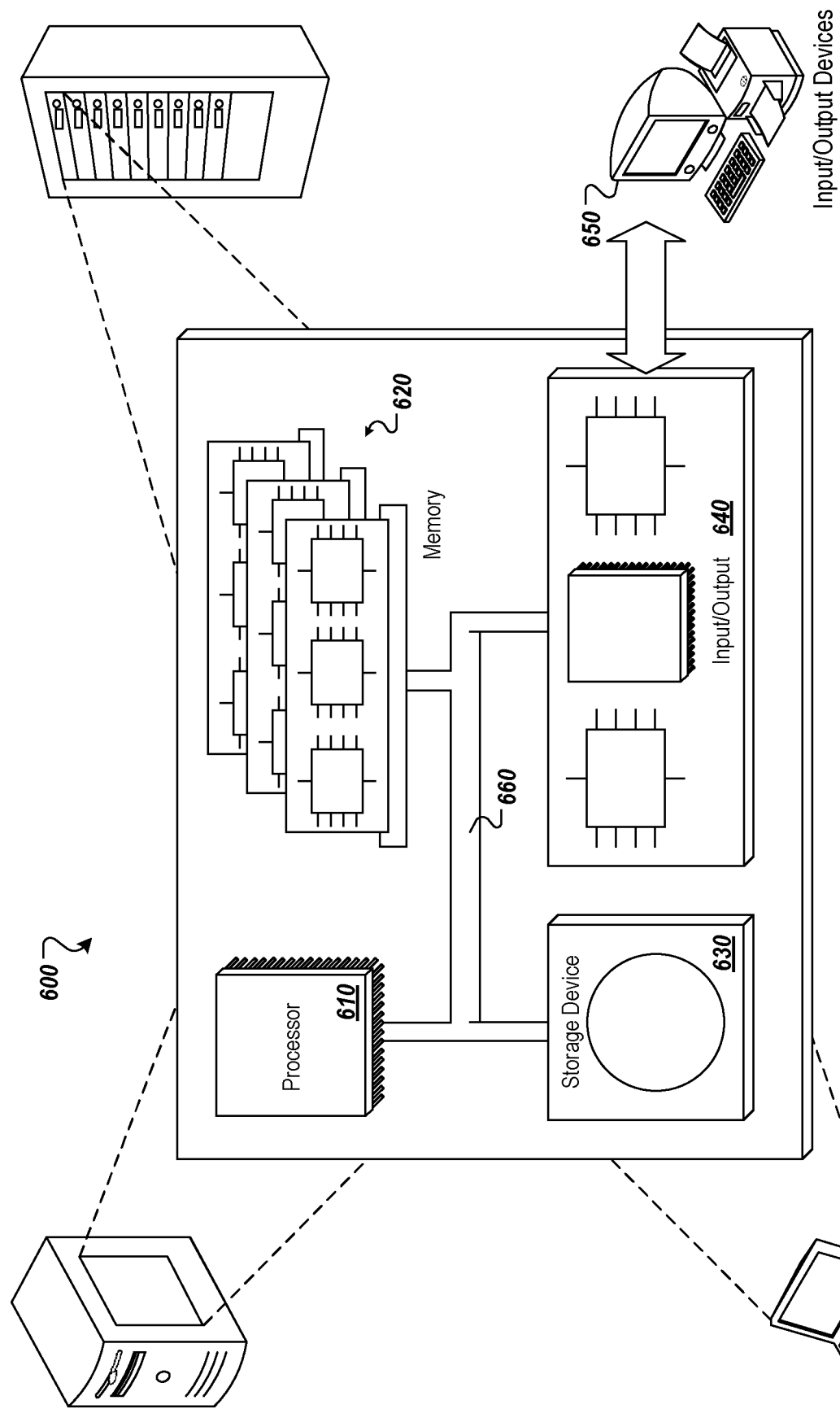
FIG. 6 depicts an example computing system, according to implementations of the present disclosure.

FIG. 6 depicts an example computing system, according to implementations of the present disclosure. The system 600 may be used for any of the operations described with respect to the various implementations discussed herein. For example, the system 600 may be included, at least in part, in the user device 104, the server computing device(s) 118, and/or other computing device(s) described herein. The system 600 may include one or more processors 610, a memory 620, one or more storage devices 630, and one or more input/output (I/O) devices 650 controllable through one or more I/O interfaces 640. The various components 610, 620, 630, 640, or 650 may be interconnected through at least one system bus 660, which may enable the transfer of data between the various modules and components of the system 600.

The processor(s) 610 may be configured to process instructions for execution within the system 600. The processor(s) 610 may include single-threaded processor(s), multi-threaded processor(s), or both. The processor(s) 610 may be configured to process instructions stored in the memory 620 or on the storage device(s) 630. The processor(s) 610 may include hardware-based processor(s) each including one or more cores. The processor(s) 610 may include general purpose processor(s), special purpose processor(s), or both.

The memory 620 may store information within the system 600. In some implementations, the memory 620 includes one or more computer-readable media. The memory 620 may include any number of volatile memory units, any number of non-volatile memory units, or both volatile and non-volatile memory units. The memory 620 may include read-only memory, random access memory, or both. In some examples, the memory 620 may be employed as active or physical memory by one or more executing software modules.

The storage device(s) 630 may be configured to provide (e.g., persistent) mass storage for the system 600. In some implementations, the storage device(s) 630 may include one or more computer-readable media. For example, the storage device(s) 630 may include a floppy disk device, a hard disk device, an optical disk device, or a tape device. The storage device(s) 630 may include read-only memory, random access memory, or both. The storage device(s) 630 may include one or more of an internal hard drive, an external hard drive, or a removable drive.

One or both of the memory 620 or the storage device(s) 630 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 600. In some implementations, the CRSM may include a data store that provides storage of computer-readable instructions or other information in a non-transitory format. The CRSM may be incorporated into the system 600 or may be external with respect to the system 600. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 610 and the memory 620 may be supplemented by, or incorporated into, one or more application-specific integrated circuits (ASICs).

The system 600 may include one or more I/O devices 650. The I/O device(s) 650 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 650 may also include one or more output devices such as a display, LED(s), an audio output device (e.g., a speaker), a printer, a haptic output device, and so forth. The I/O device(s) 650 may be physically incorporated in one or more computing devices of the system 600, or may be external with respect to one or more computing devices of the system 600.

The system 600 may include one or more I/O interfaces 640 to enable components or modules of the system 600 to control, interface with, or otherwise communicate with the I/O device(s) 650. The I/O interface(s) 640 may enable information to be transferred in or out of the system 600, or between components of the system 600, through serial communication, parallel communication, or other types of communication. For example, the I/O interface(s) 640 may comply with a version of the RS-232 standard for serial ports, or with a version of the IEEE 1284 standard for parallel ports. As another example, the I/O interface(s) 640 may be configured to provide a connection over Universal Serial Bus (USB) or Ethernet. In some examples, the I/O interface(s) 640 may be configured to provide a serial connection that is compliant with a version of the IEEE 1394 standard.

The I/O interface(s) 640 may also include one or more network interfaces that enable communications between computing devices in the system 600, or between the system 600 and other network-connected computing systems. The network interface(s) may include one or more network interface controllers (NICs) or other types of transceiver devices configured to send and receive communications over one or more networks using any network protocol.

Computing devices of the system 600 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 600 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A system, comprising:
   at least one processor; and
   one or more non-transitory computer readable media communicatively coupled to the at least one processor, the one or more non-transitory computer readable media storing instructions which, when executed by the at least one processor, cause the at least one processor to perform operations comprising:
  receiving, by the at least one processor from a first user device, a login and a password to access an account associated with a user of the first user device;
  receiving, by the at least one processor from the first user device, transaction data to be included on a digital check, the transaction data provided through a user interface (UI) executing on the first user device;
  determining, by the at least one processor, a digital watermark to be included on the digital check, the digital watermark being unique to the digital check;
  generating, by the at least one processor, a computer image of the digital check, the computer image including a first image of the digital watermark and an image of the transaction data, wherein generating the computer image of the digital check comprises:
    generating a first plurality of curves as a function of the login,
    including the first plurality of curves in the first image of the digital watermark, and
    combining the first image of the digital watermark and the image of the transaction data;
  transmitting, by the at least one processor to the first user device, the computer image of the digital check for presentation through the UI on the first user device;
  receiving, by the at least one processor from a second user device, a presentation of the computer image of the digital check for payment;
  retrieving, by the at least one processor, the digital watermark from the computer image of the digital check that was received from the second user device;
  generating, by the at least one processor, independent of the first image of the digital watermark, a second image of the digital watermark, wherein generating the second image of the digital watermark comprises:
    generating a second plurality of curves as a function of the login, and
    including the second plurality of curves in the second image of the digital watermark; and
  validating, by the at least one processor, the digital check based on a similarity between (i) the first plurality of curves in the digital watermark that was retrieved from the computer image of the digital check that was received from the second user device and (ii) the second plurality of curves in the second image of the digital watermark.

2. The system of claim 1, the operations further comprising:
  determining a serial identifier (ID) that uniquely corresponds to the digital check; and
  including the serial ID in the computer image of the digital check.

3. The system of claim 2, wherein the first plurality of curves is generated as a function of the serial ID.

4. The system of claim 2, the operations further comprising:
  determining, by the at least one processor, a transaction ID associated with the digital check; and
  associating, by the at least one processor, the transaction ID with the serial ID in a data structure;

wherein the first plurality of curves is generated as a function of the transaction ID.

5. The system of claim 1, wherein the transaction data describes:
  an amount of funds to be transferred using the digital check; and
  an account number of an account to be used as a source of the funds.

6. The system of claim 5, the operations further comprising:
  verifying, by the at least one processor, that a current balance of the account to be used as a source of the funds is at least the amount.

7. The system of claim 1, the operations further comprising:
  receiving, by the at least one processor from the first user device, a digital signature that is applied to the computer image of the digital check through the UI on the first user device, and
  responsive to receiving the digital signature, reserving an amount of funds to be accessible only through presentation of the computer image of the digital check.

8. A computer-implemented method performed by at least one processor, the method comprising:
  receiving, by the at least one processor from a first user device, a login and a password to access an account associated with a user of the first user device;
  receiving, by the at least one processor from the first user device, transaction data to be included on a digital check, the transaction data provided through a user interface (UI) executing on the first user device;
  determining, by the at least one processor, a digital watermark to be included on the digital check, the digital watermark being unique to the digital check;
  generating, by the at least one processor, a computer image of the digital check, the computer image including a first image of the digital watermark and an image of the transaction data, wherein generating the computer image of the digital check comprises:
    generating a first plurality of curves as a function of the login,
    including the first plurality of curves in the first image of the digital watermark, and
    combining the first image of the digital watermark and the image of the transaction data;
  transmitting, by the at least one processor, the computer image of the digital check for presentation through the UI on the first user device;
  receiving, by the at least one processor from a second user device, a presentation of the computer image of the digital check for payment;
  retrieving, by the at least one processor, the digital watermark from the computer image of the digital check that was received from the second user device;
  generating, by the at least one processor, independent of the first image of the digital watermark, a second image of the digital watermark, wherein generating the second image of the digital watermark comprises:
    generating a second plurality of curves as a function of the login, and
    including the second plurality of curves in the second image of the digital watermark; and
  validating, by the at least one processor, the digital check based on a similarity between (i) the first plurality of curves in the digital watermark that was retrieved from the computer image of the digital check that was received from the second user device and (ii) the second plurality of curves in the second image of the digital watermark.

9. One or more non-transitory computer-readable media storing instructions which, when executed by at least one processor, cause the at least one processor to perform operations comprising:

receiving, by the at least one processor from a first user device, a login and a password to access an account associated with a user of the first user device;

receiving, by the at least one processor from the first user device, transaction data to be included on a digital check, the transaction data provided through a user interface (UI) executing on the first user device;

determining, by the at least one processor, a digital watermark to be included on the digital check, the digital watermark being unique to the digital check;

generating, by the at least one processor, a computer image of the digital check, the computer image including a first image of the digital watermark and an image of the transaction data, wherein generating the computer image of the digital check comprises:

generating a first plurality of curves as a function of the login, including the first plurality of curves in the first image of the digital watermark, and combining the first image of the digital watermark and the image of the transaction data;

transmitting, by the at least one processor, the computer image of the digital check for presentation through the UI on the first user device;

receiving, by the at least one processor from a second user device, a presentation of the computer image of the digital check for payment;

retrieving, by the at least one processor, the digital watermark from the computer image of the digital check that was received from the second user device;

generating, by the at least one processor, independent of the first image of the digital watermark, a second image of the digital watermark, wherein generating the second image of the digital watermark comprises:

generating a second plurality of curves as a function of the login, and including the second plurality of curves in the second image of the digital watermark; and validating, by the at least one processor, the digital check based on a similarity between (i) the first plurality of curves in the digital watermark that was retrieved from the computer image of the digital check that was received from the second user device and (ii) the second plurality of curves in the second image of the digital watermark.

* * * * *